United States Patent
Bass et al.

[11] 4,068,920
[45] Jan. 17, 1978

[54] FLEXIBLE WAVE GUIDE FOR LASER LIGHT TRANSMISSION

[75] Inventors: Michael Bass, Pacific Palisades; Elsa Garmire, Pasadena; Thomas R. McMahon, Los Angeles, all of Calif.

[73] Assignee: University of Southern California, Los Angeles, Calif.

[21] Appl. No.: 716,296

[22] Filed: Aug. 20, 1976

[51] Int. Cl.$^2$ ............................................. G02B 5/14
[52] U.S. Cl. ............................................. 350/96 WG
[58] Field of Search ............... 350/96 WG; 333/95 R, 333/95 A; 331/94.5 C

[56] References Cited
U.S. PATENT DOCUMENTS

| | | | |
|---|---|---|---|
| 3,583,786 | 6/1971 | Marcatili | 350/96 WG |
| 3,939,439 | 2/1976 | Fletcher et al. | 350/96 WG X |

OTHER PUBLICATIONS

E. A. J. Marcatili, R. A. Schmeltzer, Bell Syst. Tech. Journ. No. 43, p. 1783, 1964.
H. Nishihara, T. Inoue, J. Koyama, "Low-Loss Parallel–Plate Waveguide at 10.6 $\mu$m", Appl. Phys. Lett vol. 25, No. 7, Oct. 1974, pp. 391–393.
K. D. Lackman, W. H. Steier, "Waveguides: Characteristic Modes of Hollow Rectangular Dielectric Waveguides", Appl. Opt. vol. 15, No. 5, May 1976, pp. 1334–1340.
R. L. Abrahms, W. B. Bridges, "Characteristic of Sealed-Off Waveguide $CO_2$ Laser", IEEE J of Quantum Elec. vol. QE-9, No. 9, Sept. 1973, pp. 940–946.

*Primary Examiner*—Paul A. Sacher
*Assistant Examiner*—Rolf Hille
*Attorney, Agent, or Firm*—Harris, Kern, Wallen & Tinsley

[57] ABSTRACT

A flexible hollow rectangular wave guide for transmission of radiation in the infrared portion of the spectrum, including infrared laser radiation. A wave guide which may be bent and twisted while providing low loss transmission of infrared radiation. An all metal wave guide with the width to heighth ratio at least 4 to 1. A wave guide with metal surfaces on the long dimension and dielectric surfaces on the short dimension and having a width to height ratio at least 2 to 1.

17 Claims, 12 Drawing Figures

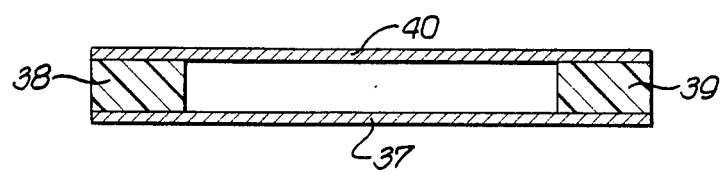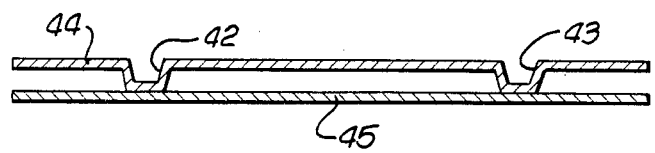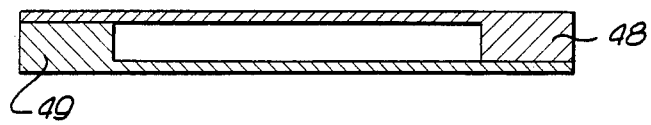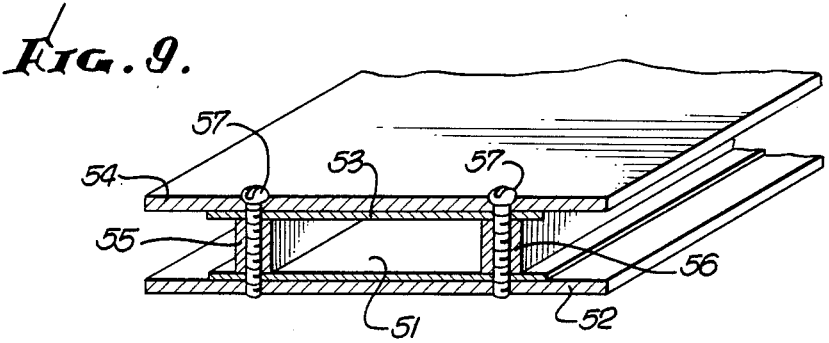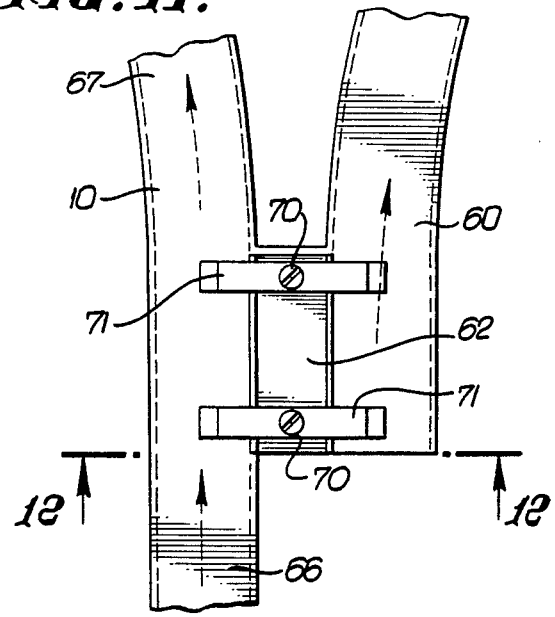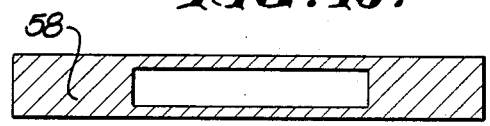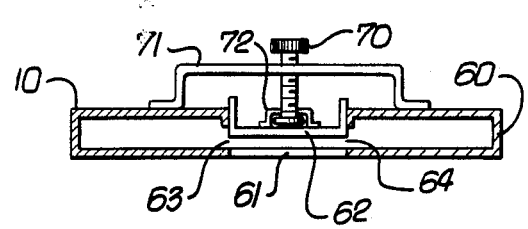

FLEXIBLE WAVE GUIDE FOR LASER LIGHT TRANSMISSION

BACKGROUND OF THE INVENTION

This invention relates to apparatus for transmission of infrared radiation, particularly infrared laser radiation, and in particular to flexible structures for transmission of infrared radiation at low loss.

At the present time, optical fibers are widely used for transmission of radiation in the visible portion of the spectrum. The fibers are highly flexible and permit moving and steering of the light. The fiber optic systems are particularly valuable in endoscopes and similar instruments which provide for inspection of the interior of body organs such as the stomach.

Infrared radiation, typically from a laser source, is used today in a variety of applications including welding, cutting and surgery. There is a need for a flexible system for delivery of infrared radiation to a target; however, fibers transparent in the infrared region have not been developed. Rather complex and delicate articulated arm optical systems are being used for guiding infrared beams.

Accordingly, it is an object of the present invention to provide a new and improved apparatus for transmitting and steering infrared radiation. A particular object is to provide such an apparatus which is small and flexible and which can handle a high energy beam with low loss.

Cylindrical hollow dielectric guides have been used for transmission of radiation from carbon dioxide lasers which operate in the infrared region, typically at 10.6 micrometers. However these wave guides are not flexible and cannot be used in a flexible application because of the large bending losses.

Hollow rectangular metal wave guides are used for the transmission of energy in the microwave region, utilizing single mode structures having a width to heighth ratio in the order of 2 to 1. However the theory of operation of the microwave wave guide indicates that the wave guides will not be satisfactory for transmission of infrared radiation.

An article entitled Low-Loss Parallel-Plate Wave Guide at 10.6 $\mu$m by Nishihara et al appearing in Applied Physics Letters, Volume 25, Number 7, Oct. 1, 1974 at pages 391–393 discloses the use of a planar metallic wave guide in the infrared region, showing an open sided guide with curved surfaces, with the width to heighth ratio being infinite. This infinite width structure suffers from leakage of energy at the open sides and is not readily bent or twisted.

It is an object of the present invention to provide a new and improved hollow rectangular wave guide suitable for transmission of energy in the infrared portion of the spectrum, with the wave guide being readily bent and twisted without introducing appreciable loss in the transmission.

SUMMARY OF THE INVENTION

The present invention contemplates a hollow rectangular wave guide for transmission of radiation in the infrared portion of the spectrum while being flexible and readily bent and twisted without introducing appreciable transmission loss. The wave guide comprises top and bottom walls of thin flexible material with metal inner surfaces and side walls of flexible material having either metal or dielectric inner surfaces. With the dielectric inner surface for the side walls, the ratio of width to heighth is at least 2 to 1, and with the side walls having metal inner surfaces, the ratio of width to height is at least 4 to 1, with both the width and the height being at least about ten times the wavelength of the infrared radiation. The invention also includes various particular configurations for providing the desired wave guide structure.

BRIEF DESCRIPTION OF THE DRAWINGS

FIGS. 5–10 are sectional views, some in perspective, showing alternative configurations for the wave guide of FIG. 1;

FIG. 11 is a plan view of a wave guide assembly operable as an optical switch; and FIG. 12 is an enlarged sectional view taken along the line 12—12 of FIG. 11.

DESCRIPTION OF THE PREFERRED EMBODIMENTS

Figure 1:
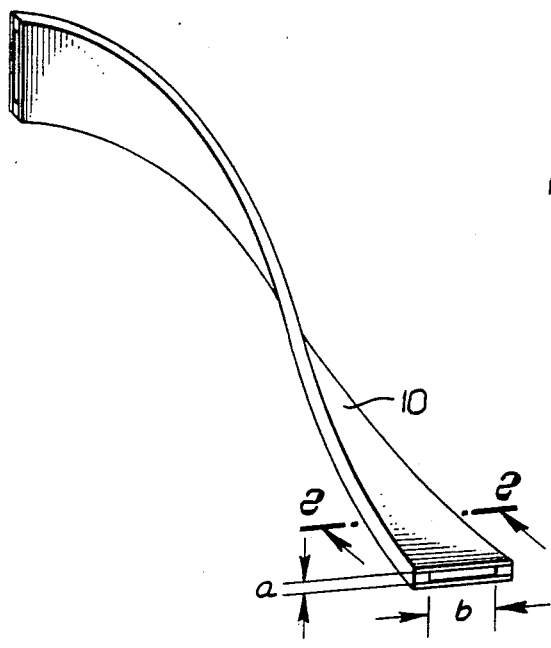
FIG. 1 is a perspective view of a length of flexible hollow rectangular wave guide incorporating the presently preferred embodiment of the invention.
Figure 2:
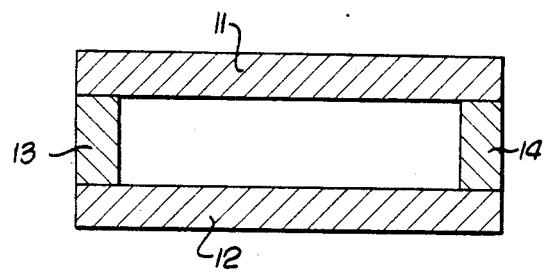
FIG. 2 is an enlarged sectional view taken along the line 2—2 of FIG. 1.
Figure 4:
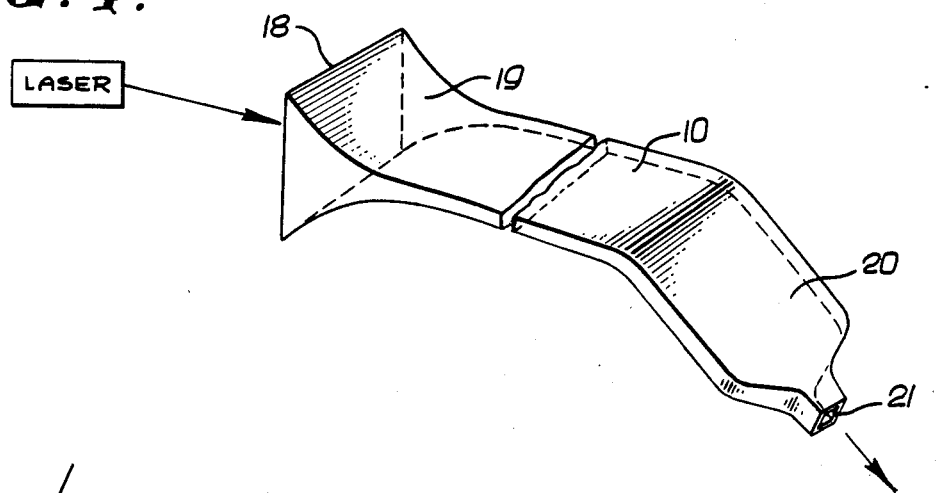
FIG. 4 is a diagram illustrating the use of the flexible wave guide with a laser source.

A length of wave guide 10 is shown in FIG. 1 bent and twisted to illustrate its flexibility. The wave guide 10 is hollow and rectangular and as illustrated in FIG. 2 comprises a top wall 11, a bottom wall 12, and end walls 13, 14. The members forming the walls 11–14 are thin metal strips which may be connected at the corners by welding or soldering. Alternative forms are shown in FIGS. 5–10 and will be described hereinbelow. A typical wave guide of the invention for transmission of radiation from a carbon dioxide laser operating at 10.6 micrometers will have an inside width $b$ of 2 millimeters and an inside height $a$ of 0.5 millimeters, with the wall members having a thickness on the order of 0.2 millimeters. Such a structure is readily bent and twisted to direct radiation from a source to a target. One such application is illustrated in FIG. 4, with the wave guide 10 having a square inlet opening 18, a transition section 19 from the inlet opening to the body of the wave guide, another transition section 20, and an outlet opening 21. Radiation from a source 22 is directed to the inlet opening 18 either directly or through a lens system, with radiation exiting from the opening 21 and with the wave guide 10 being bent or otherwise flexed to direct the radiation to the desired target.

Figure 3:
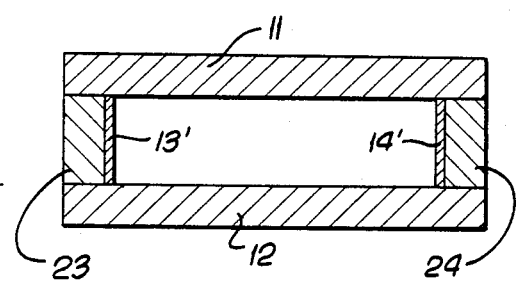
FIG. 3 is a view similar to that of FIG. 2 showing an alternative construction for the wave guide.

An alternative configuration for the wave guide is shown in FIG. 3, with the side walls in the form of dielectric strips 13', 14', preferably backed by metal strips 23, 24 which may function as heat sinks.

The hollow rectangular flexible infrared transmissive wave guide can transmit >95% of incident 10.6 $\mu$m laser radiation for distances on the order of one to ten meters when the dimensions $a$ and $b$ are maintained within certain limits. The flexibility of the wave guide makes it possible to conveniently deliver laser energy to targets which are to be cut, welded or heat treated. The wave guide can make the use of infrared laser radiation to simultaneously cut and cauterize tissue, more readily accepted in surgery.

For the embodiment with metal inner surfaces for the top and bottom walls and for the side walls, the ratio b/a should be at least 4/1. For the embodiment with metal inner surfaces for the top and bottom walls and dielectric inner surfaces for the side walls, the ratio b/a should be at least 2/1. In both embodiments, each of $a$ and $b$ should be at least about ten times the wavelength of the infrared radiation. The wave guide functions as a multimode transmissive device for the infrared radiation while confining the radiation completely and providing flexibility with very little loss. For high power applications, such as transmission of 250 watts of continuous laser power for cutting and welding metals, the heating in the dielectric side walls may be excessive, and the all metal wave guide would be preferable. On the other hand, with lower power applications such as surgery, the smaller possible dimensions of the dielectric side wall wave guide indicate its use.

The wave guide of the present invention works because for radiation in the infrared portion of the spectrum (1-100 μm), a metal has a complex conductivity (this is the same as saying it has a dielectric constant as well as a finite conductivity). If only a real conductivity is used in designing a guide, as in typical microwave analyses, one would predict the need for wave guides 3 cm wide, and such a guide would not be flexible. The use of a complex conductivity shows that wave guides can be as small as 6 mm wide and still transmit 95% of the incident energy, and hence be bent and twisted. An understanding of the theory and design of microwave wave guides teaches that a flexible hollow rectangular guide is not feasible for infrared.

The fact that a metal in the infrared has a finite conductivity as well as a dielectric constant means that it cannot be treated theoretically as either a pure metal (such as in the microwave regime) or as a pure dielectric. Low loss hollow dielectric wave guides must be much wider than metal waveguides (>0.4 mm) and cannot be bent without introducing extremely large amounts of loss. The metal-like effect of a metal at 10 μm allows the top and bottom walls to be near each other and the dielectric-like effect of the metal allow the side walls to be near each other and still retain low loss propagation of radiation polarized parallel to the top and bottom of the guide.

Theoretically the metal can be described by a complex refractive index $\nu = n - ix$, and the exponential power loss coefficient for the lowest order mode can be written as $$\alpha = \frac{\lambda^2}{a^3} \cdot \frac{n_1}{n_1^2 + n_1^2} + \frac{\lambda^2}{b^3} n_2 + \frac{a^3 \gamma}{\lambda^2 R^2} \cdot \frac{n_1}{n_1^2 + n_1^2}, \quad (1)$$

where $a$ and $b$ are the height and width of the rectangular guide, respectively. The last term is the bending loss, when the guide is bent in an arc of radius of curvature R. $\gamma$ is a numerical factor which experimentally is the order of 1. Different values of refractive index for the top and bottom walls (subscript 1) and the sidewalls (subscript 2) have been included. This allows consideration of sidewalls made of a different material than the top and bottom.

Consider an all-copper wave guide, for which $\nu = 13 - i65$ at 10.6μm. As an example, when $a = 0.2$ mm and $b = 6$ mm, a meter wave guide transmits 95% of the incident light, even while bent in a radius of curvature less than 50 cm. The form of Equation 1 shows that the loss from the side walls and bending will be high unless $$b \geq \left[ (n_1^2 + n_1^2) \frac{n_2}{n_1} \right]^{\frac{1}{2}} a, \quad (2)$$

and $$R \geq \frac{a^3}{\lambda^2}. \quad (3)$$

Finally, substantial transmission in length L requires $$a >> \left( \lambda^2 L \frac{n_1}{n_1^2 + n_1^2} \right)^{\frac{1}{2}}. \quad (4)$$

These are the conditions which determine the specific geometry of the present invention.

For flexible wave guides, R must be <1 meter. As an example, consider $\lambda = 10$ μm, R = 1 meter. Equation 3 requires $a \leq 400$ μm while the condition of Equation 4 requires a >> 30 μm. This discovery of possible values defines a narrow useful region for the wave guide of the invention.

Equation 2 determines the condition on side wall distance required. If all walls are metal ($n - ix = 13 - i65$), then $b \geq 16a$. If the side walls are dielectric ($n_2 \approx 1.5$), $b \geq 8a$. Thus it is seen that low loss guides with dielectric side walls can be made even narrower than guides with metallic side walls.

Hence for the wave guide of the invention operating near 10 μm, with metal side walls, the preferred ranges for $a$ and $b$ are $0.1 \leq a \leq 2$ mm $1 \leq b \leq 20$ mm with $b/a \geq 4/1$, and with dielectric sidewalls, the preferred ranges are $0.1 \leq a \leq 2$ mm $0.2 \leq b \leq 20$ mm with $b/a \geq 2/1$.

For other wavelengths, the dimensions scale by the preceeding equations.

Figure 5:
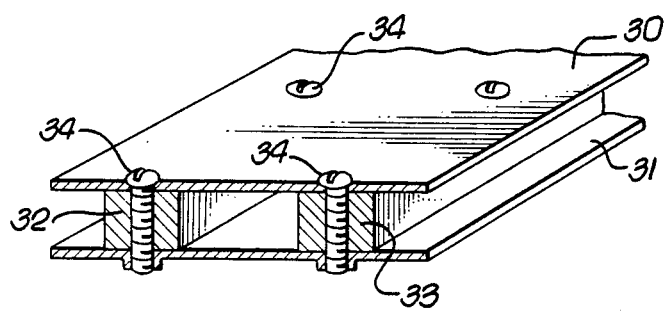

FIG. 5 illustrates one alternative construction for the wave guide 10. Metal strips 30, 31 are spaced by metal strips 32, 33, with the strips held together by screws 34 passing through holes in the strips 30, 32, 33 and engaging threaded openings formed in the strip 31. Typically the strips 30, 31 are one meter long and formed of aluminum or copper, for example, with one polished surface which is used as the inner surface. The strips 32, 33 typically are brass with the inner surface machined to provide a smooth flat surface with square corners. The wave guide internal cross section typically is 10 millimeters wide and 0.5 millimeters high, with the screws being positioned about one-quarter inch apart along the length of the guide.

FIG. 6 illustrates a cross section of a wave guide produced by photo etching. A layer of a photoresist material is applied to a metal sheet 37. An appropriate mask defining the width of the wave guide is applied over the photoresist layer, the assembly is exposed to radiation and then developed, resulting in removal of the central portion of the photoresist material leaving side walls 38, 39 of photoresist material. An upper metal sheet 40 is bonded to the side walls 38, 39 as by means of adhesive, heat and/or pressure, to produce the completed wave guide. If metal is desired for the inner surfaces of the side walls, a metallic layer may be applied to the side walls 38, 39 before the top wall 40 is applied, typically by vapor deposition.

In the embodiment of FIG. 7, parallel grooves 42, 43 are formed in a metal strip 44, after which the strip 44 is attached to another strip 45, typically by welding. In the embodiment illustrated, both grooves are formed in one sheet. Alternatively, one groove can be formed in each sheet to produce the same result.

In the embodiment of FIG. 8, metal strips 48, 49 of rectangular cross section are machined to L-shaped cross sections as shown in FIG. 8, and are then assembled to form the desired hollow rectangular cross section. The two strips may be joined together by conventional means, such as screws along the opposing sides or welding along the outer seams. Typically the initial metal strips may be thin sheets of aluminum or copper in the order of 16 millimeters wide and 0.75 millimeters thick, with the resultant wave guide cross section being 10 millimeters wide and 0.5 millimeters high.

Another alternative construction is shown in FIG. 9. A thin adhesive backed metal tape 51 is attached to a thin strip 52. Another adhesive backed metal tape 53 is attached to another strip 54. Typically the tapes 51, 53 are in the order of 2/1000 of an inch thick, with the sheets 52, 54 in the order of 20/1000 of an inch. The sheets 52, 54 may be metal or plastic as desired. In the embodiment illustrated, the sheets 52, 54 are spaced apart by strips 55, 56, with the assembly being held together by screws 57 similar to that shown in FIG. 5. Alternatively, grooves can be produced in one or both of the sheets 52, 54 for assembly in the manner illustrated in FIG. 7. The strips 55, 56 may be of metal for an all metal wave guide, or may be of dielectric or of dielectric backed by metal for the combination metal-dielectric wave guide.

The small size of the wave guide makes it readily adaptable to other manufacturing techniques, and one result is shown in FIG. 10 where a tube 58 is extruded or pulled from a bar. In one embodiment, the starting material may be metal such a aluminum or copper. In another embodiment, the starting material may be a dielectric such as plastic or glass, and a metallic film may be applied to the inner surfaces to produce the completed wave guide.

An optical switch utilizing the wave guide of the present invention is shown in FIGS. 11 and 12. A length of wave guide 60 is attached to a wave guide 10 in spaced relation by a fixed plate 61 and a movable plate 62. Openings 63, 64 in the adjacent side walls of the wave guides 10, 60, respectively provide for transmission from the guide 10 to the guide 60, with transmission occurring through the space between the plates 61, 62. In the embodiment illustrated, radiation arrives via the portion 66 of wave guide 10 and leaves either through the portion 67 of wave guide 10 or through the wave guide 60, depending upon the spacing between the plates 61, 62. This spacing is variable and one means for controlling the spacing is shown in FIGS. 11 and 12, comprising screws 70 threadingly mounted in brackets 71, with the ends of the screws coupled to the plate 62 by brackets 72. Alternative mechanisms for moving the plate 62 will readily be apparent. The plate 62 may be moved continuously over the range as by the threaded mechanism illustrated, or may be switched between two preset positions by a snap action mechanism, as desired.

Although exemplary embodiments of the invention have been disclosed and discussed, it will be understood that other applications of the invention are possible and that the embodiments may be subjected to various changes, modifications and substitutions without necessarily departing from the spirit of the invention.

We claim:

1. A hollow rectangular wave guide for transmission of radiation in the infrared portion of the spectrum, comprising:
    top and bottom walls of thin flexible material with metal inner surfaces spaced apart a distance $a$; and
    side walls of a flexible material and spaced apart a distance $b$, with the ratio of $b/a$ at least about 4/1 and with each of $a$ and $b$ at least about ten times the wavelength of the infrared radiation.

2. A wave guide as defined in claim 1 wherein said side walls have metal inner surfaces.

3. A wave guide as defined in claim 1 wherein said side walls have dielectric inner surfaces.

4. A wave guide as defined in claim 1 wherein said side walls are metal with a dielectric layer at the inner face of each.

5. A wave guide as defined in claim 1 wherein said walls have continuous smooth inner surfaces.

6. A wave guide as defined in claim 1 wherein said top and bottom walls are metal strips with said side walls fixed therebetween.

7. A wave guide as defined in claim 1 wherein said top and bottom walls are metal strips and said side walls are of a photoresist material.

8. A wave guide as defined in claim 7 including a metallic layer on the inner surfaces of said side walls.

9. A wave guide as defined in claim 1 wherein said top and bottom walls are metal strips joined together at parallel grooves which form said side walls.

10. A wave guide as defined in claim 1 including a first L shaped strip forming said top wall and one of said side walls, and a second L-shaped strip forming said bottom wall and the other of said side walls.

11. A hollow rectangular wave guide for transmission of radiation in the infrared portion of the spectrum, comprising:
    top and bottom walls of thin flexible material with metal inner surfaces spaced apart a distance $a$; and
    side walls of flexible material with dielectric inner surfaces spaced apart a distance $b$, with the ratio of $b/a$ at least 2/1 and with each of $a$ and $b$ at least about ten times the wavelength of the infrared radiation.

12. A wave guide as defined in claim 11 wherein said side walls are metal with a dielectric layer at the inner face of each.

13. A wave guide as defined in claim 11 wherein said top and bottom walls are metal strips and said side walls are metal with a dielectric layer at the inner face of each.

14. A wave guide as defined in claim 11 wherein said walls have continuous smooth inner surfaces.

15. A wave guide as defined in claim 11 wherein said top and bottom walls are metal strips and said side walls are of a photoresist material.

16. A wave guide as defined in claim 11 including:

a second hollow rectangular wave guide;

first means joining said wave guides in spaced relation along side walls thereof, with openings in the adjacent side walls providing communication from one wave guide to the other between spaced plates; and means for varying the spacing of said plates.

17. A wave guide as defined in claim 1 including:
a second hollow rectangular wave guide;

first means joining said wave guides in spaced relation along side walls thereof, with openings in the adjacent side walls providing communication from one wave guide to the other between spaced plates; and means for varying the spacing of said plates.

* * * * *